March 3, 1970   R. J. PIPER   3,498,445
CONVEYOR DRIVE MEANS
Filed Oct. 30, 1967   2 Sheets-Sheet 1

INVENTOR
ROBERT J. PIPER
BY Hauke, Krass, & Gifford
ATTORNEYS

March 3, 1970 R. J. PIPER 3,498,445
CONVEYOR DRIVE MEANS
Filed Oct. 30, 1967 2 Sheets-Sheet 2

INVENTOR
ROBERT J. PIPER
BY *Hauke, Krass, & Gifford*
ATTORNEYS

United States Patent Office

3,498,445
Patented Mar. 3, 1970

---

3,498,445
CONVEYOR DRIVE MEANS
Robert J. Piper, Detroit, Mich., assignor to Stearns Manufacturing Company, Inc., Flat Rock, Mich., a corporation of Michigan
Filed Oct. 30, 1967, Ser. No. 679,081
Int. Cl. B65g *15/00, 17/00*
U.S. Cl. 198—181                              6 Claims

ABSTRACT OF THE DISCLOSURE

A drive means for a conveyor of the endless type which is adapted to traverse a closed circuit, the load-bearing pallets of the conveyor being articulated to allow the conveyor to traverse relatively sharp curves and return in a closed loop so as to provide transportation in two directions. Chain drive means are employed so as to provide a control drive at a straight section of the conveyor circuit wherein the driven members extend downwardly from the conveyor pallets to engage driving members within the confines of the drive chains.

---

BACKGROUND OF THE INVENTION

Field of the invention

This invention relates to conveyors and more particularly to so-called "moving sidewalks" which constitute powered conveyor sections adapted to move people on a horizontal or up and down incline.

Description of the prior art

In the prior art, various methods for propelling platform conveyors have been used. One method used for propelling platform conveyors includes drive screws or helices adapted to engage pins or the like secured to the pallets. An example of this type of conveyor drive means is disclosed in U.S. Patent No. 1,632,569, issued June 14, 1926, to H. E. Taylor. The disadvantages of such a helical drive system includes the expensive manufacture of close tolerance components together with the excessive wear of the parts. A high noise level problem also results with this type of drive system creating an unsatisfactory condition for pedestrians being moved by the conveyor.

Still another type of drive means used with moving conveyor systems of the instant type consist of endless drive belts such as shown in U.S. Patent No. 2,926,873, issued May 17, 1960 to S. H. Seidman. The disadvantages of the belt-type drive system are numerous such as the fact that drive means must be substantially coextensive with the conveyor system and occupy a substantial depth and therefore require an excessive amount of space.

Summary

The present invention overcomes the prior art difficulties by means of a positive drive system for a movable conveyor connected so that a single drive means positioned along a straight section of the conveyor has driving members thereon to positively engage downwardly extending driven members from the individual plates or pallets in a successive manner to thereby propel the conveyor.

Each pallet consists of a flat plate having two parallel opposed sides and connecting back and front sides in the form of concave and convex semi-circles, respectively. The pallets are supported in a closed track which defines the path of the conveyor and are free to rotate about the center of the convex section of the track. The successive pallets are connected by links which have a connection that provides a freedom of movement in the horizontal plane. In traversing a curve the convex and concave surfaces of the pallets rotate with respect to one another such that their configuration prevents any gap from opening between the pallets. This unique configuration allows the conveyor to traverse relatively sharp curves, to return in a closed loop so as to provide transportation in two directions and to be connected in an upward spiral to form an escalator.

In the present embodiment of the invention, the pallets are driven by means of depending cam followers disposed at the pivotal axis of the pallet. These followers are engaged by a pair of endless drive chains supporting drive members therebetween in spaced paired relationship such that the follower is engaged by one of the pair of drive members so as to be moved in a first direction. Reversal of the chain drive mechanism allows the second drive member of the pair to in turn engage the opposite side of the cam follower to reverse the direction of travel of the conveyor. Each drive member has an arcuate portion such that the follower is engaged thereby and restrained in a transverse direction which allows the drive members to guide the travel of the pallets together with supplying motive force thereto. The contour of each of the follower engaging drive members on the drive chain is such that when the drive member is rolled out in a horizontal position it engages the intermediate portion of the follower so as not to rotate the chain links out of alignment with the centerline of the chain.

Description of the preferred embodiments

Figure 1:
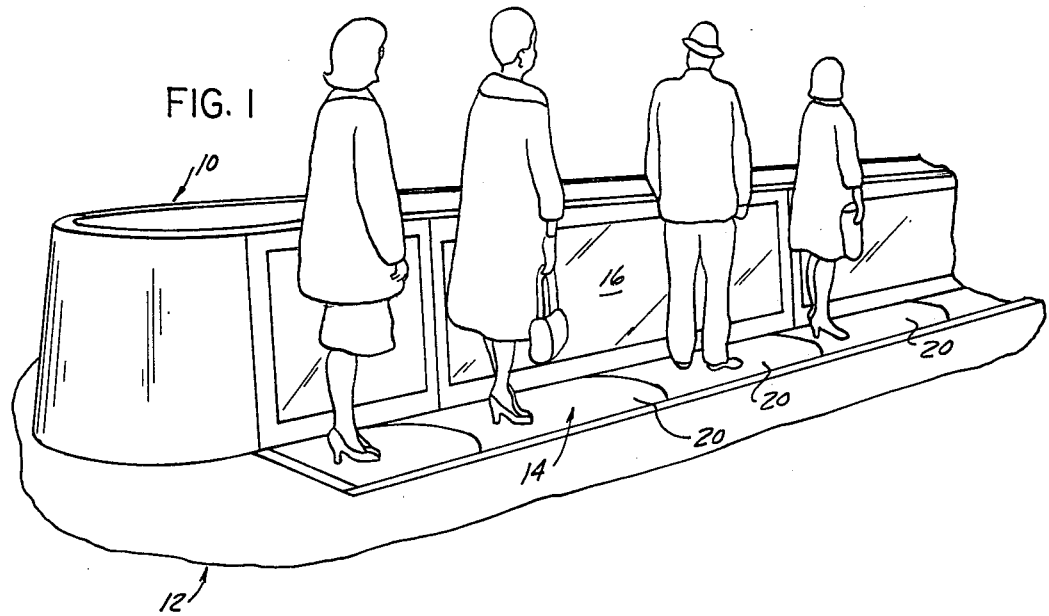
FIGURE 1 is a perspective view of a single closed loop conveyor section representing one embodiment of the present invention.

Referring to the drawings, FIGURE 1 pictorially illustrates one complete, closed loop section of the moving sidewalk conveyor generally indicated at 10. The length of a particular section is not important to the present invention and unit 10 is only partially indicated.

The sidewalk section shown at 10 in FIGURE 1 could be incorporated into various moving sidewalk systems such as the system disclosed in U.S. Patent 3,314,517, issued Apr. 18, 1967, on an application of W. F. Karr. This patent is assigned to the same assignee as the instant application and the disclosure is incorporated by reference herein. As shown in the above mentioned patent, a plurality of conveyor sections 10 may be joined together with stationary platforms partially indicated at 12 serving as terminals and to connect the convyeor sections so the pedestrians may cross the general line of travel of the conveyor at the stationary platforms.

Figure 3:
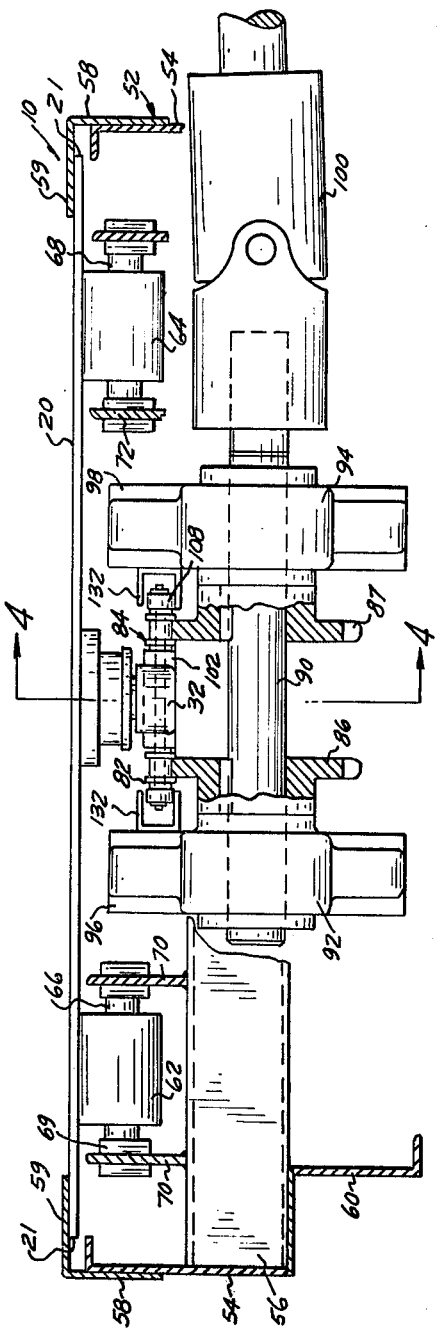
FIGURE 3 is a vertical transverse sectional view of the conveyor taken on the line 3—3 of FIGURE 1.

The section 10 comprises a first conveyor section generally indicated at 14, which moves in one direction and a second conveyor section (not shown) on the other side of vertical wall 16, which moves in the other direction. The two sections of the same closed looped conveyor line formed of a plurality of pallets 20, which are exposed in the straightaway section 14, move under the platforms 12 in a semi-circular return path at the intersections. Each pallet 20 consists of a flat plate having a pair of parallel sides 21 (FIG. 3) joined at one end by semi-circular, concave surface 22 and at the other end by a semi-circular convex surface 24.

Figure 4:
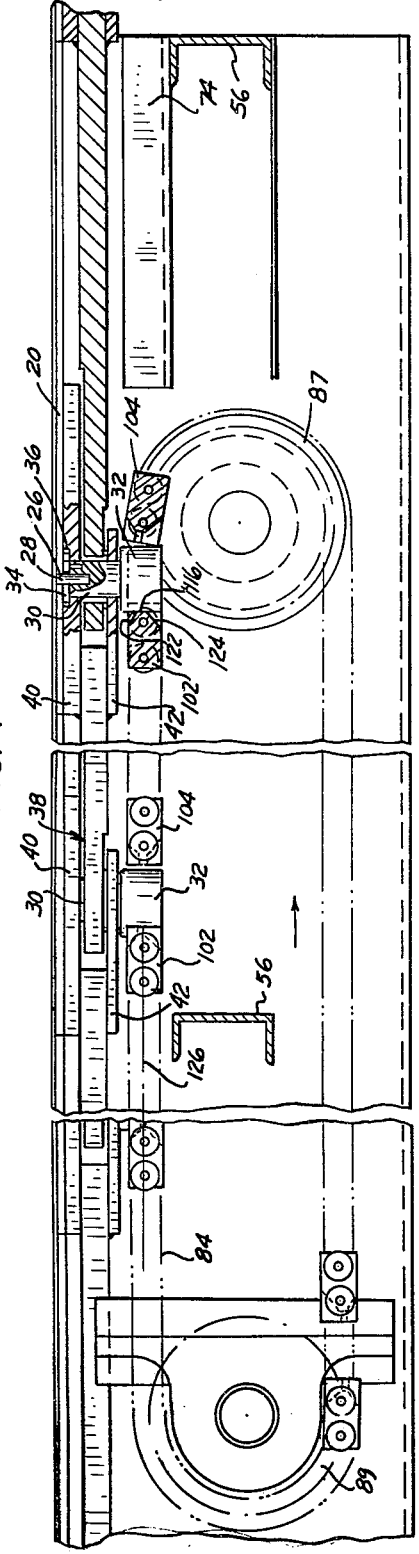
FIGURE 4 is a longitudinal sectional view taken on the line 4—4 of FIGURE 3.

As best seen in FIG. 4, each pallet 20 is provided with a central aperture 26 which is located at the center of the convex semi-circular edge 24, for the reception of a vertical pivot pin 28 extending upwardly from the central shaft portion 30 of cylindrical follower 32. The pins 28 are retained in their apertures 26 by disc members 34 positioned in annular recesses 36 formed in connecting link members, generally indicated at 38.

Each link member 38 comprises at its forward end a pair of vertically spaced parallel plate members 40 and 42 suitably secured on the upper and lower faces of the link member 38 so as to provide a bifurcated end member. Each of the plates 40 and 42 have aligned apertures therein for reception of the follower member 30. The link member 38 terminates its other end with a central aperture for receiving the shaft portion 30 of the next adjacent pallet by being received by the bifurcated end of the next following link member.

The conveyor 10 further comprises a frame generally indicated at 52, which includes a series of spaced upright iron supports 54 disposed in pairs along the conveyor, the upright iron supports 54 supporting transversely disposed angle irons 56. The conveyor is adapted to be supported on grade by suitable means such as structural members indicated at 60. Paired angle iron members 58 are suitably secured as by welding on the upper portion of the upright cross supports 54 such that the horizontal flange portions 59 thereof extend inwardly over the marginal edge portions of the pallets 20.

Figure 2:
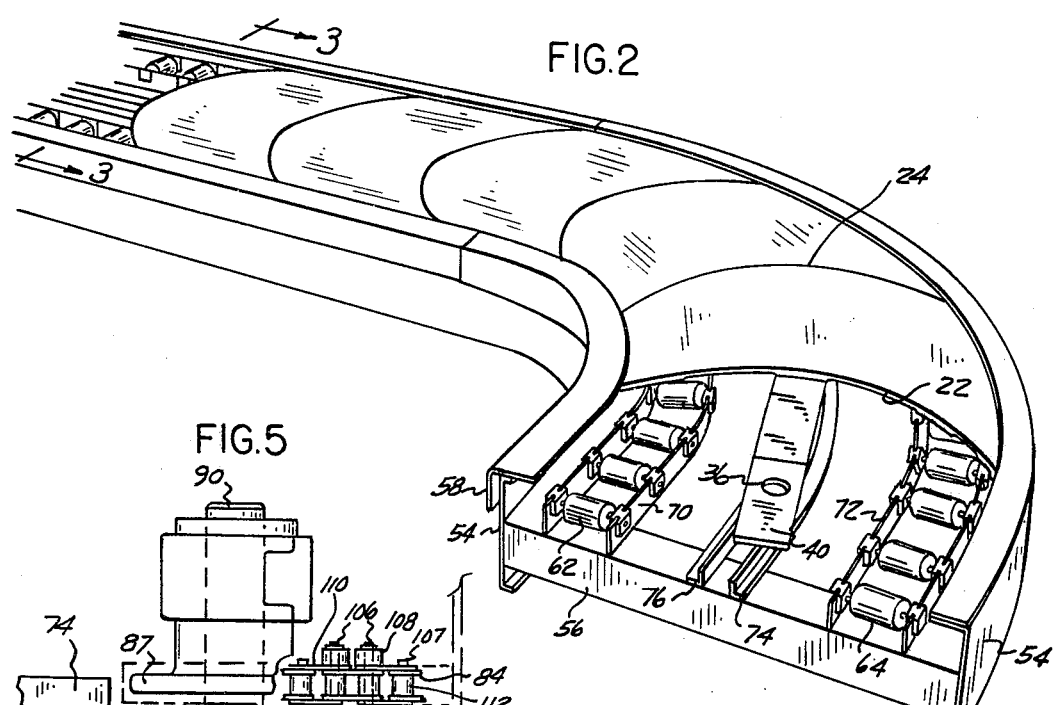
FIGURE 2 is a perspective view of a section of the conveyor with certain of the pallets removed.

The transverse channel members 56 extend between the supports 54 and support a plurality of inner rolls 62 and outer rolls 64 which are arrayed with their respective shafts 66 and 68 in a horizontal position, perpendicular to the direction of motion of the pallet sections 20. The shafts 66 and 68 are suitably journalled in bearing members 69 supported by the pair of upright support tracks 70 and 72. As best seen in FIG. 2, the tracks 70 and 72 are in the form of continuous plates curved to conform to the contour of the conveyor and supported on the transverse angle members 56.

Also suitably supported upon the frame 52 are longitudinal guides consisting of a pair of angle irons 74 and 76 positioned so as to straddle the longitudinal center line of the conveyor. The guide members 74 and 76 have their opposed upstanding flanges separated by approximately the diameter of the followers 32 supported on the underside of the pallets and the followers are tracked between the guide sections to guide the pallets along the conveyor course.

The chain of pallets 20 are driven along the conveyor path, as directed by the guides 74 and 76, by means of the pair of endless chains 82 and 84, which are disposed parallel to one another and pass over sprockets 86 and 87 disposed at the right hand end of the conveyor as viewed in FIG. 4. The sprockets are mounted on a common shaft 90 supported in space bearings 92 and 94 on frame supports, indicated at 96 and 98.

The shaft 90 is driven by suitable motive means, such as an electric gear motor and chain means (not shown) operatively connected by flexible connection 100, for example.

Figure 5:
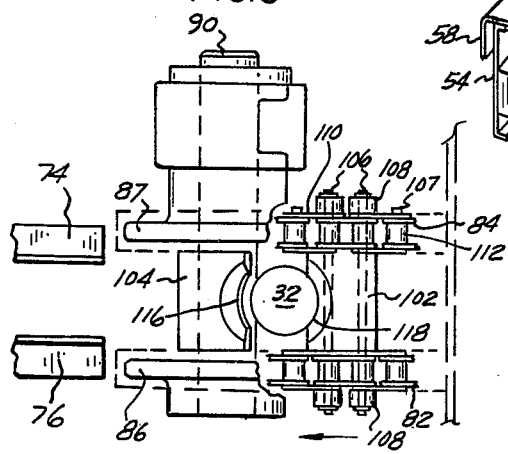
FIGURE 5 is a plan view of a portion of the drive mechanism with the conveyor pallets removed.

Paired driving dogs 102 and 104, which are mirror images of each other, are inserted between the pair of chains 86 and 88 at spaced intervals as best seen in FIGURE 5. Each of the pair of driving dogs 102 and 104 are retained by means of pairs of cross pins 106. It will be noted that cross pins 106 are received in the aligned aperture provided for the conventional locking pins 107 of the chains. Also the outer extension of the cross pins 106 have rollers mounted thereon for a purpose to be explained.

Referring to the enlarged view of a section of the conventional chain shown in FIG. 5, it will be seen that the dogs 102 and 104 have arcuate cut out sections 116 and 118 respectively, in opposed relation and contoured so as to allow each follower member 32 to extend downwardly between the adjacent dogs while being drivingly engaged by only one of the pair, depending upon the direction of travel of the chains.

As viewed in FIGURE 4, when the drive chains 82 and 84 are driven to the right hand side of the figure, as indicated by the arrow, the trailing dog 102 of each pair of dogs is in driving engagement with a follower 32 while the leading dog 104 is in spaced relation from the follower. Thus, it will be seen that when the chains are driving the pallets in their conventional forward direction only the dogs 102 are in operation. The dog 104 is provided for the reverse travel of the conveyor during which time it becomes the driving dog in the same manner as described for the dog 102. Therefore the driving operation will be described for the forward movement of the conveyor, it being understood that the operation in the reverse direction is identical unless otherwise noted.

As shown in FIGURE 4, the present invention incorporates a construction for the driving dogs wherein the upper and lower edges of the arcuate portion 116 are chamferred at 122 and 124 respectively. It will be noted that the lower chamfer 124 is of a greater extent than the upper chamber 122 such that the contacting follower surface 116 is located above the center line 126 of the chains 82 and 84.

The purpose of the chamferred surfaces 122 and 124 is to provide clearance for free articulation of the dogs in the direction required to pass around the driving sprockets 86 and 87 and idler sprockets 88 and 89. This results because the chamferred surfaces allow the driving dog 102 to engage the follower 32 without causing relative movement between the driving dog and the follower with the resultant rotation of the chain links out of alignment with the center line of the chain whereby accidental disengagement between the chain and sprocket is prevented.

Furthermore, because the guide rails are interrupted during the driving sequence the arcuate edge construction 116 makes it possible to guide the followers 32 during their travel over the chains and therefore hold the pallets 20 in alignment while at the same time insuring a positive non-slip force transfer between the driving dog and the follower.

With applicant's construction there are formed track members 132 having a channel shape in cross section and suitably secured to the conveyor frame 96 and 98 and coextensive with the horizontal travel of the chains 82 and 84 for reception of the cross pin rollers 108. In this way torque tending to rotate any of the driving dogs 102 is counteracted by the pair of rollers 108 on either side of the dog 102 positioned in channel-shaped track members 132.

It will further be observed that the distance between the driving and idler sprockets is comparatively small so that an above-grade installation of the moving platform is required to be only a few inches above the surrounding level so that relatively short, gradually inclined ramps may be used to provide access and egress from the conveyor to the existing grade. Thus the fact that the driving dogs 102 and 104 of the drive are located substantially within the confines of the chain links contributes to the reduction in vertical depth of applicant's conveyor drive.

By way of explanation, and in no way intending to limit the scope of the appended claims, a three horsepower electric gearmotor was employed to drive a complete closed loop section of the moving sidewalk conveyor of the type shown in FIG. 1. The chain drive was of a length such that no more than two driving dogs 102 were in driving contact with the followers at any one instant of time. This result was achieved due to the fact that the chamferred, arcuate configuration of the driving dog edges 116 permits instant uninterrupted engagement of the followers wherein the pallets are guided in a positive non-slip manner.

I claim:

1. A power conveyor of the type described, comprising
    (a) an endless series of closely-coupled pallet members each having a follower member extending downwardly therefrom;
    (b) means for supporting the pallet members for sliding motion about a closed course;
    (c) means extending along the center of the closed course and receiving the follower member for guiding the travel of the pallet members about the course;
    (d) driving means interposed with the guide means for successive engagement with the follower members to power the pallets about the course;
    (e) a pair of spaced parallel endless chains extending along a selected straight-section of the conveyor course, and
    (f) drive members positioned between said chains wherein said driving members are located substantially within the confines of the links of said chain during horizontal movement.

2. The conveyor of claim 1 wherein
    (a) said follower members are cylindrical in shape, and
    (b) said driving members have arcuate portions formed therein conforming to a portion of the follower members for receiving the follower members in guiding engagement.

3. The conveyor of claim 2 wherein
    (a) said driving members are positioned in spaced paired relation between said chains whereby the conveyor can be powered in both a forward or reverse direction.

4. The conveyor of claim 2, wherein the arcuate portions of said driving members have their upper and lower edges chamferred to drivingly engage the driven follower members in a manner whereby relative movement therebetween is prevented.

5. The conveyor as defined in claim 1, wherein said drive members are provided with wheel members mounted outwardly from said endless chains for cooperation with track means for support of said chains in proper driving position.

6. A power conveyor of the type described, comprising; an endless series of closely-coupled pallet members each having a follower member extending downwardly therefrom, means for supporting the pallet members for sliding motion about a closed course, means extending along the center of the course for receiving the follower members to guide the travel of the pallet members about the course, a plurality of links interconnecting the pallets with each link rotatably connected to the follower members of immediately adjacent pallets, adjacent links being in overlapping relationship with one another at the connection thereof to each follower member, said follower members extending downwardly beneath the pivotal connection thereof to said links, driving means disposed beneath said links and engaging the lower portions of said follower members for moving the pallets about the course.

References Cited

UNITED STATES PATENTS

| 1,191,434 | 7/1916 | Keith | 198—181 |
| 2,150,610 | 3/1939 | Raffetto | 198—181 |

FOREIGN PATENTS

| 399,683 | 10/1933 | Great Britain. |

EDWARD A. SROKA, Primary Examiner

U.S. Cl. X.R.

104—25